(12) United States Patent
Lowery et al.

(10) Patent No.: US 9,236,951 B2
(45) Date of Patent: Jan. 12, 2016

(54) ELECTRONIC COMPENSATION OF CROSS-PHASE MODULATION

(75) Inventors: Arthur James Lowery, Victoria (AU); Liang Bangyuan Du, Victoria (AU)

(73) Assignee: OFIDIUM PTY. LTD., Melbourne, Victoria (AU)

( * ) Notice: Subject to any disclaimer, the term of this patent is extended or adjusted under 35 U.S.C. 154(b) by 178 days.

(21) Appl. No.: 13/996,562

(22) PCT Filed: Dec. 19, 2011

(86) PCT No.: PCT/AU2011/001627
§ 371 (c)(1),
(2), (4) Date: Aug. 30, 2013

(87) PCT Pub. No.: WO2012/083344
PCT Pub. Date: Jun. 28, 2012

(65) Prior Publication Data
US 2014/0286642 A1    Sep. 25, 2014

Related U.S. Application Data

(60) Provisional application No. 61/426,260, filed on Dec. 22, 2010.

(51) Int. Cl.
*H04B 10/00*      (2013.01)
*H04B 10/61*      (2013.01)
(Continued)

(52) U.S. Cl.
CPC .......... *H04B 10/616* (2013.01); *H04B 10/2507* (2013.01); *H04B 10/697* (2013.01); *H04B 10/6971* (2013.01)

(58) Field of Classification Search
USPC ................................................ 398/202–214
See application file for complete search history.

(56) References Cited

U.S. PATENT DOCUMENTS 8,112,001 B2    2/2012  Lowery et al.
8,879,922 B2 *  11/2014 Liu et al. ........................ 398/152
(Continued)

FOREIGN PATENT DOCUMENTS

WO    WO 2012/083344 A1    6/2012

OTHER PUBLICATIONS

Inan, et al., "Pilot-Tone-based Nonlinearity Compensation for Optical OFDM Systems",ECOC, Sep. 2010, 19-23.
(Continued)

*Primary Examiner* — Agustin Bello
(74) *Attorney, Agent, or Firm* — Baker & Hostetler LLP (57) ABSTRACT

An optical signal (116) is modulated with a transmitted electrical signal comprising an information-bearing component (122) and a pilot tone (120) having a predetermined frequency. Transmission of the signal results in distortion, including nonlinear optical transmission impairments. A method of receiving the signal includes detecting the optical signal to produce a received electrical signal (X) comprising a distorted variant of the transmitted electrical signal. The pilot tone is extracted from the received electrical signal using a filtering operation (308) having a predetermined characteristic, and a compensation signal determined based upon the extracted pilot tone. The compensation signal is applied to the received electrical signal (X) to produce a compensated signal (Y) having reduced distortion. The predetermined characteristic of the filtering operation (308) is represented by one or more parameters having values selected so as to substantially maximize a measure of quality of the compensated signal.

17 Claims, 3 Drawing Sheets

(51) Int. Cl.
*H04B 10/69* (2013.01)
*H04B 10/2507* (2013.01)

(56) References Cited

U.S. PATENT DOCUMENTS

| | | |
|---|---|---|
| 2006/0078070 A1* | 4/2006 | Zhidkov et al. ............... 375/326 |
| 2006/0127104 A1* | 6/2006 | Harley et al. ................. 398/198 |
| 2008/0056305 A1* | 3/2008 | Medvedev et al. ............ 370/491 |
| 2010/0104284 A1* | 4/2010 | Liu et al. ......................... 398/65 |
| 2010/0232796 A1 | 9/2010 | Cai |
| 2010/0247099 A1* | 9/2010 | Lowery et al. ................... 398/79 |
| 2011/0255870 A1* | 10/2011 | Grigoryan et al. .............. 398/65 |
| 2011/0274442 A1* | 11/2011 | Zhang et al. ................... 398/208 |
| 2011/0305462 A1* | 12/2011 | Buelow .......................... 398/158 |
| 2012/0039606 A1* | 2/2012 | Grigoryan et al. .............. 398/65 |
| 2012/0148255 A1* | 6/2012 | Liu et al. ........................ 398/136 |
| 2013/0136449 A1* | 5/2013 | Liu et al. .......................... 398/65 |
| 2013/0170841 A1* | 7/2013 | Liu et al. ........................ 398/183 |
| 2014/0286642 A1* | 9/2014 | Lowery et al. ................. 398/115 |

OTHER PUBLICATIONS

Ip, et al, "Nonlinear Impairment Compensation Using Backpropagation", InTechOpen, Dec. 1, 2009, 467-494.

* cited by examiner

ELECTRONIC COMPENSATION OF CROSS-PHASE MODULATION

CROSS-REFERENCE TO RELATED APPLICATIONS

This application is the National Stage of International Application No. PCT/AU2011/001627, filed Dec. 19, 2011, which claims the benefit of U.S. Application No. 61/426,260, filed Dec. 22, 2010, the disclosures of which are incorporated herein by reference in their entireties.

FIELD OF THE INVENTION

The present invention relates to coherent optical communications, and in particular a method, apparatus and system for mitigation of nonlinear transmission impairments.

BACKGROUND OF THE INVENTION

In recent times, there has been an increasing interest in the use of coherent optical communications for high-capacity and long-haul transmission, particularly at bit rates of 40 Gb/s and higher.

Coherent optical communication systems provide a number of potential advantages over more-conventionally deployed incoherent (i.e. intensity-modulated direct-detection) systems. These include improved receiver sensitivity, the ability to employ more sophisticated and spectrally efficient modulation formats, and the ability to compensate for linear transmission impairments, such as Chromatic Dispersion (CD) and Polarisation Mode Dispersion (PMD), within the electronic domain, for example using digital signal processing within the optical receiver.

As a result, the ultimate limitation on channel capacity within a coherent optical communications link is generally the nonlinear transmission impairments. While silica optical fibres exhibit very low nonlinearity, even this small effect becomes significant at high transmission powers, and over long transmission distances. Degradation of transmitted signals due to fibre nonlinearity increases with transmission power, and accordingly the channel capacity of an optical link cannot be increased indefinitely merely by increasing the signal launch power. Fibre nonlinearity is a deterministic phenomenon, which translates intensity fluctuations in the propagating signals into phase errors via the Kerr effect. However, compensating for fibre nonlinearity is challenging in the presence of CD, because the intensity waveform evolves along each fibre span.

In Wavelength Division Multiplexing (WDM) systems, inter-channel nonlinear impairments, predominantly Cross-Phase Modulation (XPM), provide the greatest compensation challenge. The inter-channel impairments are generated by intensity fluctuations in neighbouring WDM channels, and may vary not only due to CD, but also because WDM channels may be added, dropped and/or switched within a network, resulting in corresponding dynamic changes to the nonlinear interactions.

Many deployed optical fibre transmission systems comprise in-line dispersion compensation or management elements, such as spans of Dispersion Compensating Fibre (DCF). These systems are designed to minimise the accumulation of CD, particularly for the benefit of incoherent optical channels for which the compensation of chromatic dispersion in the electrical domain is not feasible. However, dispersion-managed systems can create their own problems when used to carry coherent optical channels, due to the impact of dispersion management on the nonlinear impairments. For example, coherent modulation formats, such as Coherent Optical Orthogonal Frequency Division Multiplexing (CO-OFDM) may exhibit very high peak-to-average power ratio, which results in strong intensity fluctuations throughout a transmission link. In systems employing in-line dispersion compensation, these fluctuations have the same waveform within each span of the link. As a result, phase errors add coherently from span-to-span, leading to strong nonlinear distortion. This distortion results not only from XPM in WDM systems, but also from Self-Phase Modulation (SPM) within each individual channel.

Methods and apparatus for mitigating the effects of SPM in CO-OFDM transmission links are disclosed in U.S. patent application Ser. No. 12/445,386, to Lowery et al, having a filing date of 20 Dec. 2007. However, these methods are based on knowledge of the signal waveform in an individual transmitted channel, and are therefore less effective in the presence of XPM due to adjacent channels in WDM systems, where the adjacent channel waveforms are generally unknown.

There is, therefore, an ongoing need for further improvements in nonlinear compensation in coherent optical communications systems. Desirably, compensation techniques should be implementable in the electrical domain, for example using digital signal processing methods. It is also desirable that new nonlinear compensation methods are applicable to systems both with and without in-line dispersion compensation and/or management.

It is, accordingly, an object of the present invention to meet the abovementioned needs.

SUMMARY OF THE INVENTION

Embodiments of the present invention provide a method of receiving an optical signal modulated with a transmitted electrical signal which comprises an information-bearing component and a pilot tone having a predetermined frequency, the method comprising steps of:

detecting the optical signal to produce a received electrical signal comprising a distorted variant of the transmitted electrical signal, wherein sources of distortion of the received signal include nonlinear optical transmission impairments;

extracting the pilot tone from the received electrical signal using a filtering operation having a predetermined characteristic;

determining a compensation signal based upon the extracted pilot tone; and applying the compensation signal to the received electrical signal to produce a compensated signal having reduced distortion resulting from said nonlinear optical transmission impairments, wherein the predetermined characteristic of the filtering operation is represented by one or more parameters having values selected so as to substantially maximise a measure of quality of the compensated signal.

The concept underlying embodiments of the invention is the recognition by the inventors that a pilot tone accompanying an information-bearing signal component experiences the same nonlinear transmission impairments as a signal component at the same frequency. Accordingly, by extracting the pilot tone from the received electrical signal, a compensation signal may be determined that can be used to mitigate the effects of nonlinear transmission impairment upon the information signal. Significantly, however, the inventors have found that the effectiveness of this general technique is strongly dependent upon the manner in which the pilot tone is extracted from the received electrical signal. In particular, the pilot tone must be separated from the information-bearing signal components using an appropriately defined filtering function, which is generally dependent upon parameters of the optical transmission system itself, such as the link dispersion map and/or the transmitted optical power.

The parameters of the filtering operation are advantageously adaptive, to enable on-line maximisation of compensated signal quality.

The nonlinear optical impairments mitigated by embodiments of the invention may include one or both of SPM and XPM.

In some embodiments, the method may include a further step, prior to detecting the optical signal, of compensating for at least a portion of linear dispersion accumulated by the optical signal in a transmission link.

It has been found by the present inventors that linear dispersion, such as CD, can limit the effectiveness of the method in compensating for SPM. Specifically, the accumulation of linear dispersion causes the phase of the pilot tone to 'walk off' from that of more-distant spectral components of the information-bearing signal. Accordingly, in such cases it may be advantageous to manage the linear dispersion within the transmission link, to reduce the residual phase offsets between pilot and signal components, so as to improve the effectiveness of the nonlinear compensation. On the other hand, as has been noted, full dispersion compensation may substantially increase the magnitude of nonlinear distortion.

In some embodiments, the step of compensating for at least a portion of linear dispersion is performed in a distributed manner along the transmission link.

Some embodiments provide a further step of mitigating SPM prior to determining the compensation signal.

Advantageously, by reducing the SPM impairment of the received signal the residual XPM impairment, which is not dependent upon the dispersion experienced within an individual channel, may be more-effectively mitigated. The step of mitigating SPM may be performed using the methods disclosed in U.S. patent application Ser. No. 12/445,386, referenced above, the contents of which are hereby incorporated into the present specification by reference, in their entirety.

The step of mitigating SPM may be performed at least partly prior to transmission, whereby the transmitted optical signal is a pre-compensated signal.

In accordance with the disclosure in U.S. application Ser. No. 12/445,386, the step of mitigating SPM may comprise modulating a phase of the transmitted electrical signal, the optical signal, and/or the received electrical signal with an SPM-mitigating signal which is derived from a measure of instantaneous power of the optical signal. More particularly, an SPM-mitigating signal may be derived by multiplying a measure of instantaneous power of the optical signal by a system-dependent constant value. Deriving the SPM-mitigating signal may further include applying a filtering function.

In some embodiments, the parameters of the filtering operation include a measure of bandwidth.

Embodiments of the invention may comprise a preliminary step of adjusting the values of adaptive parameters of the predetermined characteristic of the filtering function, at least during an initial training period, in order to substantially maximise a measure of quality of a known training signal. Advantageously, the use of a training signal, and a training period, enables the most-appropriate values of the adaptive parameters to be determined on-line, and without knowledge of the transmitted signal properties, or full details of the transmission system. If a subsequent reduction in the quality of the compensated signal is detected, for example as a result of some change in the transmitted signal, the training process may be reinitiated.

Further embodiments of the invention provide an apparatus for recovering an optical signal modulated with a transmitted electrical signal which comprises an information-bearing component and a pilot tone having a predetermined frequency, the apparatus comprising:

a coherent detection subsystem adapted to perform optical-to-electrical conversion of in-phase and quadrature components of the optical signal, and having an electrical signal output comprising a distorted variant of the transmitted electrical signal, wherein sources of distortion of the received signal include nonlinear optical transmission impairments;

a pilot tone extraction subsystem adapted to extract the pilot tone from the received electrical signal, the pilot tone extraction subsystem comprising a filter having a predetermined characteristic; and a compensation subsystem adapted to determine a compensation signal based upon the extracted pilot tone, and to apply the compensation signal to the received electrical signal to produce a compensated signal having reduced distortion resulting from said nonlinear optical transmission impairments, wherein the predetermined characteristic of the filter is represented by one or more parameters having values selected so as to substantially maximise a measure of quality of the compensated signal.

Advantageously, the filter parameters are adaptive.

An apparatus embodying the invention may further comprise an SPM mitigation subsystem disposed prior to the compensation subsystem, the SPM mitigation subsystem being adapted to modulate a phase of either the optical signal or the received electrical signal with an SPM-mitigating signal which is derived from a measure of instantaneous power of the optical signal.

Advantageously, the SPM mitigation subsystem is adapted to determine the SPM mitigation signal by multiplying the measure of instantaneous power of the optical signal by a system-dependent constant value. The SPM mitigation subsystem may further comprise a filter adapted to constrain a bandwidth of the SPM-mitigating signal.

Further embodiments of the invention provide an optical transmission system comprising:

an optical transmitter configured to generate an optical signal modulated with a transmitted electrical signal which comprises an information-bearing component and a pilot tone having a predetermined frequency;

an optical transmission link having an input end receiving the optical signal, and an output end, the transmission link having a nonlinear optical propagation characteristic whereby a signal at the output end of the link comprises a distorted variant of the transmitted signal including nonlinear optical transmission impairments;

an optical receiver operatively coupled to the output end of the transmission link for receiving the output optical signal, the receiver comprising:

a coherent detection subsystem adapted to perform optical-to-electrical conversion of in-phase and quadrature components of the optical signal, and having an electrical signal output comprising a distorted variant of the transmitted electrical signal, wherein sources of distortion of the received signal include said nonlinear optical transmission impairments;

a pilot tone extraction subsystem adapted to extract the pilot tone from the received electrical signal, the pilot tone extraction subsystem comprising a filter having a predetermined characteristic; and a compensation subsystem adapted to determine a compensation signal based upon the extracted pilot tone and to apply the compensation signal to the received electrical signal to produce a compensated signal having reduced distortion resulting from said nonlinear optical transmission impairments, wherein the predetermined characteristic of the filter is represented by one or more parameters having values selected so as to substantially maximise a measure of quality of the compensated signal.

In some embodiments, the optical transmission link comprises optical dispersion compensation or management components for compensating at least a portion of linear dispersion accumulated therein by the optical signal.

In some embodiments, the optical transmitter comprises an SPM pre-compensation subsystem, which is adapted to modulate a phase of either the transmitted electrical signal or the optical signal with an SPM-mitigating signal which is derived from a measure of instantaneous power of the optical signal. The SPM-mitigating signal may be derived by multiplying the measure of instantaneous power of the optical signal by a system-dependent constant value, and may further be derived by applying a filtering function.

Further features and benefits of the invention will be apparent from the following description of particular embodiments, which should not be considered to be limiting of the scope of the invention as described in any of the preceding statements, or in the claims appended hereto.

BRIEF DESCRIPTION OF THE DRAWINGS

Embodiments of the invention will now be described with reference to the accompanying drawings, in which like reference numerals indicate like features, and wherein.

DETAILED DESCRIPTION OF EMBODIMENTS

Figure 1:
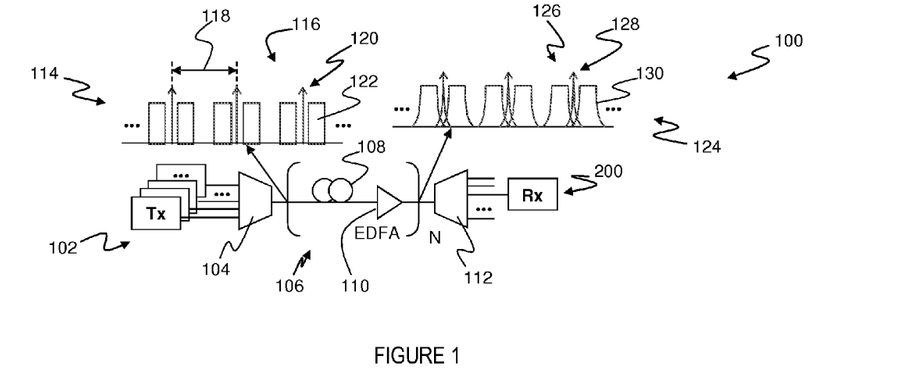
FIG. 1 is a schematic diagram illustrating a system embodying the invention.

FIG. 1 is a schematic diagram of an optical transmission system 100 embodying the present invention. The system 100 employs Wavelength Division Multiplexing (WDM), in which a plurality of transmitters 102, each operating at a different wavelength, are multiplexed via a WDM multiplexer 104, and the resulting WDM signal is transmitted via optical transmission link 106. The link 106 comprises a plurality (N) of spans, each of which includes a length of single-mode optical fibre 108, and an amplifier 110, such as an Erbium-Doped Fibre Amplifier (EDFA). Some or all of the fibre spans may also incorporate chromatic dispersion management or compensation elements, such as dispersion compensating fibres, which may advantageously be deployed within the amplifying modules 110.

A WDM demultiplexer 112 separates the various transmitted wavelength channels, each of which is received via a receiver 200 embodying the present invention.

The optical transmission link 106 has an input end at which the transmitted WDM signal, represented by the schematic spectrum 114, is received. The WDM signal 114 comprises a plurality of wavelength channels, e.g. 116, having a channel spacing 118, such as 50 GHz. In accordance with embodiments of the invention each channel 116 is modulated with a transmitted electrical signal comprising a pilot tone 120 having a predetermined frequency, and at least one information-bearing component 122. Using coherent optical modulation techniques, the transmitted electrical signal spectrum e.g. 116, is reproduced on the corresponding WDM optical carrier.

The optical signal arriving at the output end of the link comprises a distorted variant of the transmitted signal, represented by the schematic WDM spectrum 124. Each received signal channel, e.g. 126, has been subjected to various transmission impairments, including spectral 'spreading' resulting from nonlinear propagation effects including Cross-Phase Modulation (XPM) and Self-Phase Modulation (SPM). This spreading is illustrated in FIG. 1 by the broadening of the pilot tone 128 and the information-bearing component 130 of the optical spectrum 124.

Figure 2:
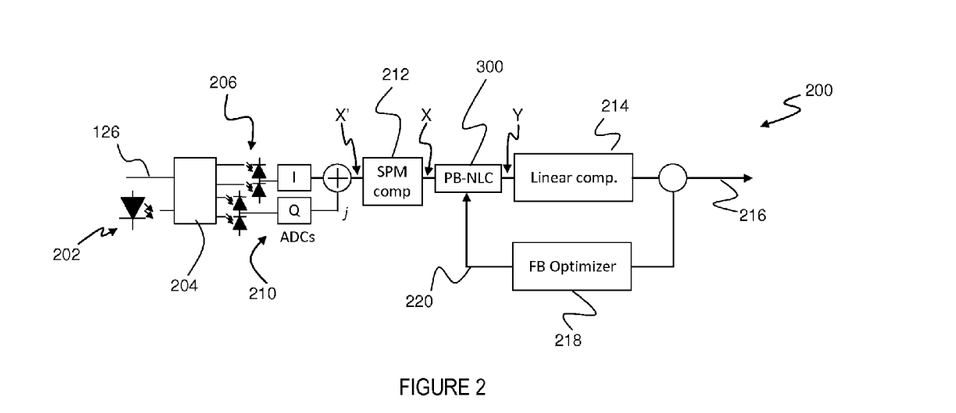
FIG. 2 is a block diagram of an optical receiver apparatus embodying the invention.

FIG. 2 is a block diagram illustrating the major subsystems of the receiver 200 in greater detail. For the sake of clarity, a single polarisation receiver will be described, however it will be appreciated that the invention is equally applicable to dual-polarisation implementations, including polarisation-diverse and polarisation-multiplexed systems.

The received optical signal 126 is combined with a local laser oscillator 202 in an optical hybrid 204, which directs four output signals to corresponding pairs of balanced photo detectors 206. As those skilled in the art will appreciate, the four outputs of the optical hybrid 204 represent respective in-phase and quadrature components of the received optical signal, in two orthogonal polarisation states. Following balanced detection, the reconstructed in-phase and quadrature signal components are, in the embodiment 200, converted to corresponding sequences of sampled digital signals by respective in-phase and quadrature analog-to-digital converters 208, 210. This process results in the generation of a sequence of complex-valued signal samples X'.

In accordance with some embodiments of the invention, an SPM compensation subsystem 212 is provided, although this may not be essential depending upon the dispersion characteristics of the transmission link 106, and other implementation aspects of the overall system 100 (such as the use of nonlinearity pre-compensation in the transmitters 102). A signal X, comprising a sequence of complex digital samples of the received optical signal 126, is input to a nonlinear compensation subsystem 300 embodying the invention. The nonlinear compensation subsystem 300 is herein referred to as a 'pilot-based nonlinear compensator' (PB-NLC). A compensated signal Y, having reduced distortion resulting from the nonlinear optical transmission impairments, is output from the PB-NLC 300. The signal Y is also a sequence of complex-valued digital samples.

Following nonlinear compensation, a linear compensation subsystem 214 applies appropriate compensation for linear effects such as Chromatic Dispersion (CD) and Polarisation Mode Dispersion (PMD), and demodulates and decodes the information-bearing component of the received signal to produce a recovered output information signal 216.

The implementation details of the linear compensation subsystem 214 depend upon the particular modulation format utilised in the coherent optical transmission system. These details are not relevant to the operation of the present invention, and are accordingly omitted from the present discussion for simplicity. However, a number of suitable modulation formats, and corresponding linear compensation subsystems 214, will be known to those skilled in the art, such as coherent optical QPSK, and coherent optical OFDM.

It is considered that it may be advantageous to employ OFDM in transmission systems embodying the present invention, because of the particular ease with which transmitted signal 116 comprising a pilot tone 120 and information-bearing components 122 may be generated. In this case, by way of example, the linear compensation subsystem 214 may comprise a Fourier transform block (e.g. implemented using the fast Fourier transform), a bank of first order OFDM channel equalisers, and a bank of de-mapping units for recovering the transmitted digital information bits.

A feedback optimiser subsystem 218 generates an adaptive control signal 220 for determining one or more corresponding adaptive parameters of a filter employed within the PB-NLC 300, as will be described in greater detail below with reference to FIGS. 3 and 4.

The embodiments of the receiving apparatus described herein employ Digital Signal Processing (DSP) in order to implement the various subsystems 212, 300, 214, 218. In practice, these subsystems may therefore comprise programmable devices such as Field-Programmable Gate Arrays (FPGAs), Application-Specific Integrated Circuits (ASICs), custom-designed VLSI circuits, programmed DSP units, or any appropriate combination of these. However, alternative embodiments of the invention may employ a higher degree of analog signal processing. For example, the SPM compensation subsystem 212, which may typically comprise deriving an optical phase modulation signal by multiplying a measure of instantaneous power of the optical signal by a system-dependent constant value, filtering this signal, and applying it as a phase modulation to the received signal, is readily implemented, in principle, entirely using analog optical, electrical and/or optoelectronic components. Accordingly, the digital implementation described herein should be considered as exemplary only, and not limiting of the possible range of implementations available.

Figure 3:
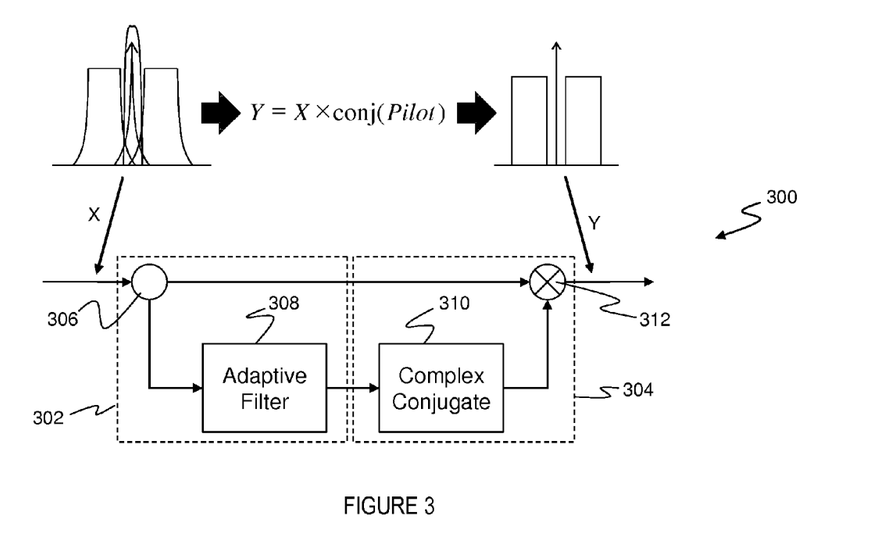
FIG. 3 is a block diagram of a nonlinear compensation subsystem embodying the invention.
Figure 4:
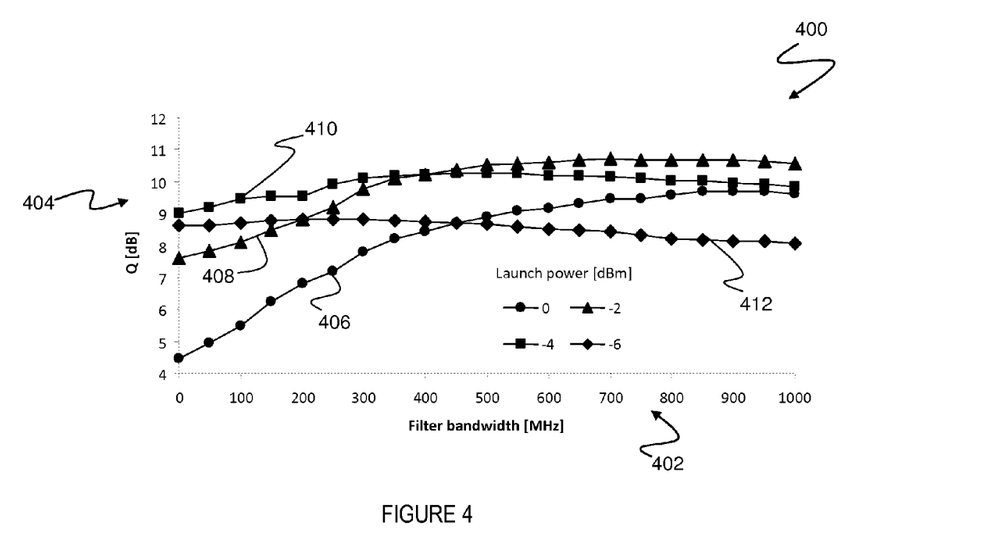
FIG. 4 is a graph illustrating optimisation of filter parameters embodying the invention.

Turning now to FIG. 3, the elements of the PB-NLC subsystem 300 are illustrated in greater detail. In particular, the PB-NLC 300 comprises a pilot tone extraction subsystem 302, and a compensation subsystem 304.

The pilot tone extraction subsystem 302 comprises a signal splitting (or copying) element 306, and an adaptive filter 308. More specifically, the adaptive filter 308 is a DSP block providing a filtering operation upon its input sequence which has a predetermined characteristic, which can be represented by one or more adaptive parameters. In an embodiment described herein, the filter 308 has a centre frequency corresponding with the frequency of the pilot tone 128, and an adaptive bandwidth. The output of the adaptive filter 308 is therefore the extracted pilot tone, which is affected by phase fluctuations from various sources, including nonlinear SPM and XPM effects. In accordance with embodiments of the invention, the objective of compensation subsystem 304 is to 'reverse' these phase fluctuations, on the basis that, in an ideal system, the information-bearing component 130 of the received signal has been subject to the same phase fluctuations.

Accordingly, the compensation subsystem 304 comprises a complex conjugator 310, the output of which is the complex conjugate of the extracted pilot tone. It will be appreciate that, in physical terms, conjugation reverses, inverts or negates the phase of the input signal, and that a variety of implementations of the conjugator 310 are possible in order to achieve this result. The amplitude of the compensation signal is not relevant to the mitigation of phase fluctuations, such as those induced by SPM and XPM, and the conjugator 310 may therefore additionally normalise the magnitude of the compensation signal, e.g. to unity, in order to avoid undesired amplitude modulation of the received signal 126. The received signal 126 is multiplied by this compensation signal using multiplier element 312, to produce the compensated signal (Y), which has reduced distortion due to the nonlinear phase fluctuations.

As noted above, the adaptive filter 308 has a characteristic that must be predetermined in order to optimise the compensation process, prior to receiving the signal to be compensated. Predetermination of the appropriate filter parameters, such as the filter bandwidth in the case of the embodiment described herein, may be achieved, for example, using an initial training period. During such a training period, a known information signal is transmitted via the system 100, enabling the receiver 200 to determine the quality of the output signal 216. The feedback optimiser 218 may therefore vary the adaptive filter parameters 220, in order to maximise the received signal quality. In general, the appropriate filter parameters will depend upon various characteristics of the transmission system 100, such as the dispersion map of the link 106, and/or the transmitted optical power.

An exemplary optimisation process will now be described with reference to FIG. 4. In particular, the graph 400 illustrates the quality of the received information signal 216 as a function of the bandwidth of the filter 308. On the horizontal axis 402 is filter bandwidth, measured in megahertz, while the vertical axis 404 is the signal quality factor Q, measured in dB. Four different curves are shown, representing four different launch powers. These curves were generated via numerical simulation of the system 100, having the following characteristics:

- eight WDM channels having a 50 GHz spacing;
- each WDM channel comprising an OFDM signal generated using a 1024-point inverse fast Fourier transform;
- in each OFDM channel, 880 subcarriers were modulated using 4-QAM modulation, 30 subcarriers either side of DC and 41 subcarriers either side of the Nyquist frequency were zeroed;
- each OFDM channel used a 128 sample cyclic prefix;
- for simplicity, simulations were restricted to a single optical polarisation state, however it will be appreciated that embodiments of the invention also encompass polarisation-multiplexed transmission;
- simulated digital-to-analog converters were used having a sampling rate of 38 gigasamples per second, providing a net bit rate of 58 Gb/s on a single optical polarisation;
- a DC bias was applied to the transmitter modulation drive in order to produce a pilot tone at the centre of the transmitted spectrum, comprising 10 percent of the total transmitted signal power;
- the total length of the optical link was 2375 km, comprising 25 spans of 95 km of standard single-mode fibre, and in-line dispersion compensating fibre to compensate for CD in each span;
- 1530 ps/nm of dispersion pre-compensation was used, and the residual dispersion in each span was 85 ps/nm;
- a double-stage EDFA, with a noise figure of 5 dB, was used to compensate for the loss of each span, and the EDFA gain was set so that the launch power into the dispersion compensating fibre was 9 dB lower than the single-mode fibre launch power, in order to minimise nonlinear effects in the dispersion-compensating fibre.

The resulting four curves in the graph 400 correspond with launch power of 0 dBm (406), −2 dBm (408), −4 dBm (410), and −6 dBm (412). In each case, it can be seen that there is a particular filter bandwidth for which the received signal quality is maximised. This bandwidth may be identified by the feedback optimiser 218, for example by 'sweeping' the filter bandwidth, or utilising a function maximisation algorithm, during an appropriate training period.

It will be appreciated from this example that, in this context, the term 'maximise' must be understood to imply maximisation within the constraints of the particular implementation. The optimiser 218 is only able to vary the available adaptive parameters of the filter 308, which may be limited to specific ranges of adjustment.

During normal operation of the receiver 200, the feedback optimiser 218 may continue to monitor the received signal quality. For example, the transmission system 100 may employ Forward Error Correction (FEC) techniques, in order to increase channel capacity by allowing tolerance for higher raw received bit error rates. In such systems, the level of error correction applied is an indication of signal quality, which may be monitored such that any degradation in quality may be detected. In such circumstances, the feedback optimiser 218 may perform further adaptation of the filter parameters 220, and/or may trigger the commencement of a new training period.

Figure 5:
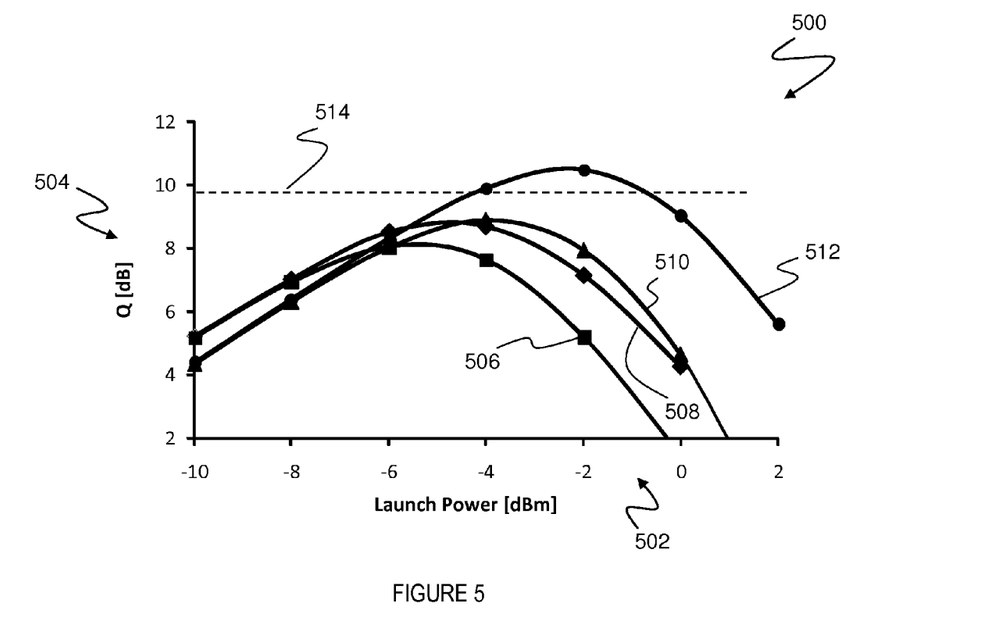
FIG. 5 is a graph illustrating improvements in received signal quality according to embodiments of the invention.

Turning now to FIG. 5 there is shown a graph 500 illustrating the improvements that may be achieved using embodiments of the present invention. The graph 500 is obtained via simulations of the same system described above, using a filter bandwidth optimised to achieve the maximum available compensated signal quality (i.e. Q of approximately 11 dB for a launch power of −2 dBm). In the graph 500, the horizontal axis 502 shows launch power in dBm, while the vertical axis 504 shows received signal quality in dB. Four different receiver configurations are represented by the curves 506, 508, 510 and 512. The dashed line 514 represents a Q value of 9.8 dB, which corresponds to a received Bit Error Rate (BER) of $10^{-3}$. This particular received signal quality is of interest because it represents an appropriate target for error-free operation following suitable FEC.

The curve 506 corresponds with a receiver 200 in which SPM compensation 212 and PB-NLC 300 are bypassed (i.e. no nonlinear compensation). The curve 508 corresponds with a receiver 200 in which only SPM compensation 212 is applied. The curve 510 represents a receiver 200 in which only PB-NLC is applied. Finally, the curve 512 represents a receiver 200 in which both SPM compensation and PB-NLC are applied.

As is apparent from the curves in the graph 500, at low launch power (e.g. below −6 dBm), the system performance is limited by signal-to-noise ratio resulting from EDFA ASE noise. There is, accordingly, only a small variation in performance between the four receiver configurations, within this range of launch power.

At higher values of launch power, nonlinear transmission impairments start to dominate the system performance. In this range, therefore, nonlinear compensation is advantageous, and enables higher launch power to be employed, with a corresponding improvement in the received signal quality. For the particular system configuration described herein, using only SPM compensation (curve 508) or only PB-NLC (curve 510) results in a similar improvement in the maximum available received signal quality, with the PB-NLC requiring slightly higher launch power in order to achieve this improvement. Most striking in this example, however, is the significant improvement achieved when both SPM compensation and PB-NLC are employed together (curve 512). In this case, the optimum launch power is increased to approximately −2 dBm, and the resulting signal quality is sufficient to exceed the desirable level of 9.8 dB.

It is believed that the benefits of SPM compensation in combination with PB-NLC in this particular example are dependent upon the dispersion management scheme. As a result, the impact of SPM is particularly significant, due to the cumulative effects over multiple spans. In links having different dispersion characteristics it is anticipated that the impact of SPM may be different, and that in some cases a far greater proportion of the available benefit of nonlinear compensation may be achieved by the PB-NLC alone.

In general, however, the impact of SPM on the effectiveness of the PB-NLC alone may be understood as follows. In optical OFDM systems, SPM is generated by subcarriers propagating within a single OFDM channel. The SPM distortions result from beating of pairs of subcarriers within the channel, which generate interfering 'difference frequency' components. Higher frequency difference components are more greatly de-correlated by chromatic dispersion, and thus the phase modulation received by the pilot tone due to SPM will not be the same as that experienced by more-distant subcarriers. As a result, SPM cannot be compensated effectively across the whole OFDM channel using only a single pilot tone. Accordingly, the larger the impact of SPM, in combination with the dispersion map of the transmission link, the less effectively the PB-NLC 300 will be able to compensate for this.

The situation with XPM is different. Distortion due to XPM results from beating between subcarriers of a different channel, causing the generation of corresponding distortion components within the channel of interest, via the Kerr effect. Because the spacing of the WDM channels is significantly greater than the spacing between the OFDM subcarriers, the largest contributions to XPM result from closely spaced subcarriers of the adjacent channels. The relative phases of such closely spaced channels are not significantly affected by CD, and therefore all subcarriers in the channel of interest receive similar levels of distortion due to XPM, as does the pilot tone. As a result, the PB-NLC 300 is largely effective in substantially cancelling the XPM across the whole of the received channel.

In summary, a pilot-tone-based nonlinear compensator which includes an adaptive filter may be used to effectively compensate for XPM in coherent optical transmission systems. In particular, characteristics of the adaptive filter should be predetermined in order to maximise received signal quality, following nonlinear compensation, within a particular system configuration. This approach can be particularly effective in systems in which XPM dominates over SPM, and in systems employing SPM compensation prior to the pilot-tone-based nonlinear compensation. In general, it is believed that the relative effectiveness of pilot-tone-based nonlinear compensation alone (i.e. in the absence of separate compensation for SPM) will depend upon the particular dispersion map of the transmission link.

While particular embodiments and examples have been described herein, it will be appreciated that many variations are possible. For example, while the disclosed embodiments include filters having adaptive parameters, to enable on-line dynamic optimisation of compensated signal quality, in alternative arrangements the filter parameters may be optimised off-line, and preset prior to commissioning of a transmission link. This modification, amongst others, is within the capability of persons skilled in the art, and accordingly the present embodiments and examples are not to be taken as limiting the scope of the invention, which is as defined in the claims appended hereto.

The invention claimed is:

1. A method of receiving an optical signal modulated with a transmitted electrical signal which comprises an information-bearing component and a pilot tone having a predetermined frequency, the method comprising steps of:
   detecting the optical signal to produce a received electrical signal comprising a distorted variant of the transmitted electrical signal, wherein sources of distortion of the received signal include nonlinear optical transmission impairments;
   extracting the pilot tone from the received electrical signal using an adaptive filter having at least an adaptive bandwidth parameter;
   determining a compensation signal which comprises a complex conjugate of the extracted pilot tone; and
   processing the received electrical signal using the compensation signal to produce a compensated signal having reduced distortion resulting from said nonlinear optical transmission impairments, wherein the processing comprises multiplying the received electrical signal by the compensation signal,
   wherein the adaptive bandwidth parameter is predetermined so as to substantially maximise a measure of quality of the compensated signal.

2. The method of claim 1 comprising a further step, prior to detecting the optical signal, of compensating for at least a portion of linear dispersion accumulated by the optical signal in a transmission link.

3. The method of claim 2 wherein the step of compensating for at least a portion of linear dispersion is performed in a distributed manner along the transmission link.

4. The method of claim 1 comprising a further step of mitigating self-phase modulation (SPM) prior to determining the compensation signal.

5. The method of claim 4 wherein the step of mitigating SPM is performed at least partly prior to transmission, whereby the transmitted optical signal is a pre-compensated signal.

6. The method of claim 5 wherein the step of mitigating SPM comprises modulating a phase of the transmitted electrical signal, the optical signal, and/or the received electrical signal with an SPM-mitigating signal which is derived from a measure of instantaneous power of the optical signal.

7. The method of claim 6 wherein the SPM-mitigating signal is derived by multiplying a measure of instantaneous power of the optical signal by a system-dependent constant value.

8. The method of claim 7 wherein a filtering function is applied to the SPM-mitigating signal.

9. The method of claim 1 further comprising a preliminary step of adjusting the adaptive bandwidth parameter, at least during an initial training period, in order to substantially maximise, within an available range of adaptation, a measure of quality of a known training signal.

10. An apparatus for recovering an optical signal modulated with a transmitted electrical signal which comprises an information-bearing component and a pilot tone having a predetermined frequency, the apparatus comprising:
    a coherent detection subsystem adapted to perform optical-to-electrical conversion of in-phase and quadrature components of the optical signal, and having an electrical signal output comprising a distorted variant of the transmitted electrical signal, wherein sources of distortion of the received signal include nonlinear optical transmission impairments;
    a pilot tone extraction subsystem adapted to extract the pilot tone from the received electrical signal, the pilot tone extraction subsystem comprising an adaptive filter having at least an adaptive bandwidth parameter; and
    a compensation subsystem adapted to determine a compensation signal which comprises a complex conjugate of the extracted pilot tone, and to process the received electrical signal to produce a compensated signal having reduced distortion resulting from said nonlinear optical transmission impairments, wherein the processing comprises multiplying the received electrical signal by the compensation signal,
    wherein the adaptive bandwidth parameter is predetermined so as to substantially maximise a measure of quality of the compensated signal.

11. The apparatus of claim 10 further comprising a self-phase modulation (SPM) mitigation subsystem disposed prior to the compensation subsystem, the SPM mitigation subsystem being adapted to modulate a phase of either the optical signal or the received electrical signal with an SPM-mitigating signal which is derived from a measure of instantaneous power of the optical signal.

12. The apparatus of claim 11 wherein the SPM mitigation subsystem is adapted to determine the SPM mitigating signal by multiplying the measure of instantaneous power of the optical signal by a system-dependent constant value.

13. The apparatus of claim 12 wherein the SPM mitigation subsystem further comprises a filter adapted to constrain a bandwidth of the SPM-mitigating signal.

14. An optical transmission system comprising:
    an optical transmitter configured to generate an optical signal modulated with a transmitted electrical signal which comprises an information-bearing component and a pilot tone having a predetermined frequency;
    an optical transmission link having an input end receiving the optical signal, and an output end, the transmission link having a nonlinear optical propagation characteristic whereby a signal at the output end of the link comprises a distorted variant of the transmitted signal including nonlinear optical transmission impairments;
    an optical receiver operatively coupled to the output end of the transmission link for receiving the output optical signal, the receiver comprising:
      a coherent detection subsystem adapted to perform optical-to-electrical conversion of in-phase and quadrature components of the optical signal, and having an electrical signal output comprising a distorted variant of the transmitted electrical signal, wherein sources of distortion of the received signal include said nonlinear optical transmission impairments;
      a pilot tone extraction subsystem adapted to extract the pilot tone from the received electrical signal, the pilot tone extraction subsystem comprising an adaptive filter having at least an adaptive bandwidth parameter; and
      a compensation subsystem adapted to determine a compensation signal which comprises a complex conjugate of the extracted pilot tone and to process the received electrical signal to produce a compensated signal having reduced distortion resulting from said nonlinear optical transmission impairments, wherein the processing comprises multiplying the received electrical signal by the compensation signal, wherein the adaptive bandwidth parameter is predetermined so as to substantially maximise a measure of quality of the compensated signal.

15. The system of claim 14 wherein the optical transmission link comprises optical dispersion compensation or management components for compensating at least a portion of linear dispersion accumulated therein by the optical signal.

16. The system of claim 14 wherein the optical transmitter comprises a self-phase modulation (SPM) pre-compensation subsystem, which is adapted to modulate a phase of either the transmitted electrical signal or the optical signal with an SPM-mitigating signal which is derived from a measure of instantaneous power of the optical signal.

17. The system of claim 16 wherein the SPM-mitigating signal is derived by multiplying the measure of instantaneous power of the optical signal by a system-dependent constant value, and applying a filtering function.

* * * * *